UNITED STATES PATENT OFFICE.

ALBERT LECOEUR, OF ROUEN, FRANCE, ASSIGNOR TO SOCIÉTÉ ANONYME LE CRINOID, OF ROUEN, FRANCE, A CORPORATION OF FRANCE.

PROCESS OF MAKING SOLUTIONS OF CUPRAMMONIUM HYDROXID.

947,715. Specification of Letters Patent. Patented Jan. 25, 1910.

No Drawing. Application filed January 12, 1909. Serial No. 471,984.

*To all whom it may concern:*

Be it known that I, ALBERT LECOEUR, a citizen of the Republic of France, residing at Rouen, France, have invented certain new and useful Improvements in the Process of Making Solutions of Cuprammonium Hydroxid, of which the following is a specification.

The present invention relates to the preparation in the manufacture of cellulose threads or filaments, of solutions of colloidal hydrated cuprammonium oxid which dissolve definite and easily regulated proportions of cellulose, according to the density and solidity of the threads or filaments of cellulose which it is desired to obtain from the spinning fluid.

As already described in my Patent No. 863,801, the solutions of colloidal hydrated cuprammonium oxid purified by dialysis yield uniform viscous solutions of cellulose which can be kept at ordinary temperatures. I have now discovered that when the whole of the hydrated cuprammonium oxid is in a colloidal state, the amount of cellulose which can be dissolved by the solution is proportional to the copper present, all the copper present being in an active state. The proportion of cellulose which may be dissolved by solutions of the requisite degree of basicity is about two parts by weight of cellulose to one part by weight of cupric oxid in solution.

Solutions of colloidal hydrated cuprammonium oxid may be prepared for instance either by treating solutions of sulfate of copper or other salts of copper with ammonia and caustic alkalies with subsequent dialysis. I call this liquor A. Or by the simultaneous action of air and ammonia on metallic copper with subsequent dialysis of the solution, as described in my Patent No. 863,802. I call the solution thus obtained liquor B. I have found however that if solutions of colloidal hydrated cuprammonium oxid prepared by the former method are beyond a certain concentration, they certain compounds, probably of sodium, which cannot be removed by filtration or dialysis, and the presence of which causes the thread to break easily and lessens its luster. Thus although it is possible to prepare solutions of colloidal hydrated cuprammonium oxid by this method containing as much as 30 grams copper per liter, in consequence of the above impurities, I have found it impracticable for the spinning of cellulose threads to employ a solution containing more than 12 grams copper or 15 grams cupric oxid prepared by this method, even in the cold. A solution of this strength is however only capable of dissolving 30 grs. cellulose per liter, even when all the copper is in the form of colloidal hydrated cuprammonium oxid, and this proportion of cellulose is too small for spinning threads of sufficient solidity.

According to the present invention a liquor A of greater strength, which is comparatively cheap to manufacture, may be employed with technically useful results if mixed with liquor B in such proportions that the resulting mixture contains about 25 grs. or upward per liter of active copper, *i. e.* in the state of colloidal hydrate cuprammonium oxid, but of which no more than about 12 grs. copper per liter is derived from liquor A. As liquor B can be prepared of much greater strength, containing 25 to 45 grs. active copper per liter, free from the above-mentioned impurities in liquor A, and capable of dissolving 110 or even 120 grs. of cellulose per liter, a suitable spinning fluid containing for example 80 or 90 grs. cellulose per liter in solution, can be prepared by the admixture of the cheaper liquor A with liquor B in suitable proportions.

I have further found that by combining the two liquors for the preparation of the cellulose solvent it is possible to obtain a substantially better and more perfectly coagulated thread than with liquor B alone, and I have found that this result is due to the lower percentage of ammonia present in the combined solutions as compared with the liquor which I have called liquor B. Moreover in order to prepare this last-mentioned liquor it is necessary to employ very strong ammonia, whereas the liquor from copper sulfate and caustic alkali can be made with comparatively little ammonia, and as ammonia is the most costly primary material in the manufacture an important economy is effected by the combination of the solutions as explained. The lower proportion of ammonia likewise enables a less concentrated precipitating bath to be employed.

The liquor A may be prepared for example by treating a solution of copper sulfate (one molecule) with caustic soda (2 molecules) in the presence of ammonia (2 molecules) in sufficiently dilute solution, so that after removal of the black particles of anhydrous cuprous oxid and the crystallizable cuprammonium oxid by filtration and dialysis, the resulting solution of colloidal cuprammonium oxid does not contain more copper in solution than will be equivalent to 12 grs. copper or 15 grs. cupric oxid per liter of the required mixture of liquor A and liquor B.

The liquor B is prepared as described in my U. S. Patent No. 863,802 by passing a current of air deprived of carbonic acid through copper turnings suspended in a solution of ammonia preferably of low density, sufficient caustic soda being added to neutralize the nitrous acid formed. The operation is stopped when the concentration of the colloidal hydrated cuprammonium oxid is sufficient to dissolve a given quantity of cellulose when added to liquor A; the solution is then submitted to dialysis to remove the impurities it still contains.

*Example of the preparaton of a cuprammoniacal solution to dissolve 90 grs. cellulose per liter.*—Mix 400 cc. liquor A containing colloidal hydrated cuprammonium oxid equivalent to 15 grs. cupric oxid or 12 grs. copper, which is capable of dissolving 30 grs. cellulose with 600 cc. liquor B, containing colloidal hydrated cuprammonium oxid equivalent to 30 grs. cupric oxid or 24 grs. copper, which is capable of dissolving 60 grs. cellulose. These proportions are given by way of example and may be varied according to the quality of the thread it is desired to manufacture. For instance it is found that with a solution prepared in this manner containing 60 grs. cellulose per liter, supple and silky threads of extreme fineness may be manufactured, but for threads of greater density solutions containing 80, 90 or 100 grs. cellulose per liter are employed.

Instead of preparing the solutions independently before effecting the admixture, as in the above example, it is of course obvious that a liquor B may be first prepared and the liquor A to be combined therewith may be prepared direct therein, the excess of ammonia in liquor B serving to form a certain part of the cuprammonium oxid of the liquor A.

The dialysis of the solutions can of course be performed before or after the mixing.

The cellulose must be submitted to the action of the solvent in a pure state, whether derived from cotton waste, wood-pulp, or other source, and it must therefore undergo preliminary treatment for eliminating the non-cellulose products and transforming the mass of cellulose substance into soluble ortho- or normal cellulose (see Fremy's classification, *Comptes Rendus* 83, page 1136) adapted for dissolving in copper liquor and producing under suitable physical and mechanical conditions a brilliant, supple and resistant thread. The solution takes place in the cold.

What I claim and desire to secure by Letters Patent is:—

1. The process of making solutions of cuprammonium hydroxid, comprising treatment of a solution of a copper salt with ammonia and caustic alkali, and treatment of metallic copper with air and ammonia in presence of water, the solutions being combined and being dialyzed, substantially as described.

2. The process of making solutions of cuprammonium hydroxid, comprising treatment of a solution of sulfate of copper with ammonia and caustic alkali, and treatment of metallic copper with air and ammonia in presence of water, the solutions being combined and being dialyzed, substantially as described.

3. The process of making solutions of cuprammonium hydroxid, comprising preparation of a solution of colloidal hydrated cuprammonium oxid by treating a solution of a copper salt, as copper sulfate, with ammonia and caustic alkali, and preparation of a solution of colloidal hydrated cuprammonium oxid containing a substantially greater quantity of active copper by treating metallic copper with air and ammonia in presence of water, said solutions being mixed and being dialyzed, substantially as described.

4. The process of making solutions of cuprammonium hydroxid, comprising preparation of a solution of colloidal hydrated cuprammonium oxid rich in ammonia by treating metallic copper with air and ammonia in presence of water, and the preparation therein of a solution of colloidal hydrated cuprammonium oxid by treatment of a copper salt, as copper sulfate, with caustic alkali and ammonia, whereby the surplus ammonia of the first mentioned solution is utilized for the preparation of the second solution, the solutions being mixed and being dialyzed, substantially as described.

5. A process of making solutions of cuprammonium hydroxid, comprising treatment of a solution of a copper salt, with ammonia and caustic alkali, and treatment of metallic copper with air and ammonia in presence of water, the solutions being dialyzed and being combined to contain twenty-five grams and upward of copper per liter in the state of colloidal hydrated cuprammonium oxid whereof not more than twelve grams copper per liter is obtained by the treatment of the copper salt in solution with ammonia and caustic alkali.

In witness whereof, I have hereunto signed my name in the presence of two subscribing witnesses.

ALBERT LECOEUR.

Witnesses:
PAUL RUDOLF,
E. M. J. DELLEPLANE.